United States Patent [19]
Krishnamurthy et al.

[11] Patent Number: 5,841,820
[45] Date of Patent: Nov. 24, 1998

[54] DATA COMPARISON AGC SYSTEM FOR VSB RECEIVER

[75] Inventors: Gopalan Krishnamurthy, Wheeling; Rudolf Turner, Hawthorn Woods, both of Ill.

[73] Assignee: Zenith Electronics Corporation, Glenview, Ill.

[21] Appl. No.: 726,501

[22] Filed: Oct. 7, 1996

[51] Int. Cl.⁶ .................................................. H04L 27/08
[52] U.S. Cl. ........................................ 375/345; 455/234.1
[58] Field of Search .................................... 375/345, 316; 455/234.1; 330/278; 348/678

[56] References Cited

U.S. PATENT DOCUMENTS

| | | | |
|---|---|---|---|
| 4,625,240 | 11/1986 | Yablonski et al. | 375/345 |
| 5,267,272 | 11/1993 | Cai et al. | 375/345 |
| 5,565,932 | 10/1996 | Citta et al. | 348/678 |
| 5,594,760 | 1/1997 | Guillaud et al. | 375/345 |
| 5,659,582 | 8/1997 | Kojima et al. | 375/345 |

*Primary Examiner*—Tesfaldet Bocure

[57] ABSTRACT

A technique and apparatus for developing AGC voltage in a receiver capable of receiving VSB signals that do not have the data symbol levels and the sync symbol levels related so as to produce the same average magnitude level. Successive portions of the signal are accumulated, stored and compared with the smaller of the samples to be used to develop the AGC voltage. By comparing the first and third of three successive samples, the effect of the larger than desired sync levels in the over-the-air VSB signals is completely eliminated.

8 Claims, 1 Drawing Sheet

DATA COMPARISON AGC SYSTEM FOR VSB RECEIVER

CROSS REFERENCE TO RELATED PATENTS AND APPLICATIONS

This invention is related to U.S. Pat. No. 5,508,748, entitled DATA LEVEL SELECTION FOR MULTILEVEL VSB TRANSMISSION SYSTEM, which is hereby incorporated by reference and application Ser. No. 726,597, filed Oct. 7, 1996 entitled SYNC COMPENSATED AGC SYSTEM FOR VSB RECEIVER, both of which are assigned to the Zenith Electronics Corporation.

BACKGROUND OF THE INVENTION AND PRIOR ART

This invention relates to VSB (vestigial sideband) signal systems and specifically to methods and apparatus for developing AGC (automatic gain control) voltages in digital VSB signals.

The recently adopted standards for digital VSB terrestrial signals establishes certain data and sync symbol levels. In the ATSC (Advanced Television Systems Committee) document, the data levels to be used for the 8VSB (trellis coded) and 16VSB (ATSC) transmission systems are specified. The VSB transmission system is not restricted to over-the-air (terrestrial) transmission and Zenith Electronics Corporation has specified three more modes that can be used for cable or MMDS systems. These VSB modes are identified as 8/4/2 VSB cable modes. The two 8VSB modes differ only in the amount of data that is carried. As fully discussed in the above-mentioned patent, the data levels and sync levels in the various VSB cable modes may be selected to bear a desired relationship to each other, which results in great simplification and reduced cost in data slicing and error correction. This relationship also enables ready production of AGC voltages from the VSB signal. Unfortunately, that desired relationship is not present during the bilevel segment sync and frame sync of the standards adopted by the ATSC and need not be present in VSB signals that may be used.

With the desired relationship, the average value of the magnitude of the data symbols and the average value of the magnitude of the sync symbols are the same. In some of the signals mentioned, that relationship is not present as the average of the magnitude of data levels is not the same as the average of the magnitude of reference sync levels. Therefore the production of AGC potentials based upon data and sync amplitude averaging is prone to error.

The present invention solves the problems created by the undesired relationship between sync and data for AGC generation in a number of ways and enables a VSB receiver to generate AGC voltages for all VSB mode signals in a relatively simple manner.

OBJECTS OF THE INVENTION

A principal object of the invention is to provide a novel VSB receiver.

Another object of the invention is to provide a VSB receiver that can readily produce AGC voltages for all VSB mode signals in a simple manner.

A further object of the invention is to provide a novel method and apparatus for generating AGC voltages for VSB mode signals.

BRIEF DESCRIPTION OF THE DRAWING

These and other objects and advantages of the invention will be apparent upon reading the following description thereof in conjunction with the drawing, in which.

DESCRIPTION OF THE PREFERRED EMBODIMENT

Figure 1:
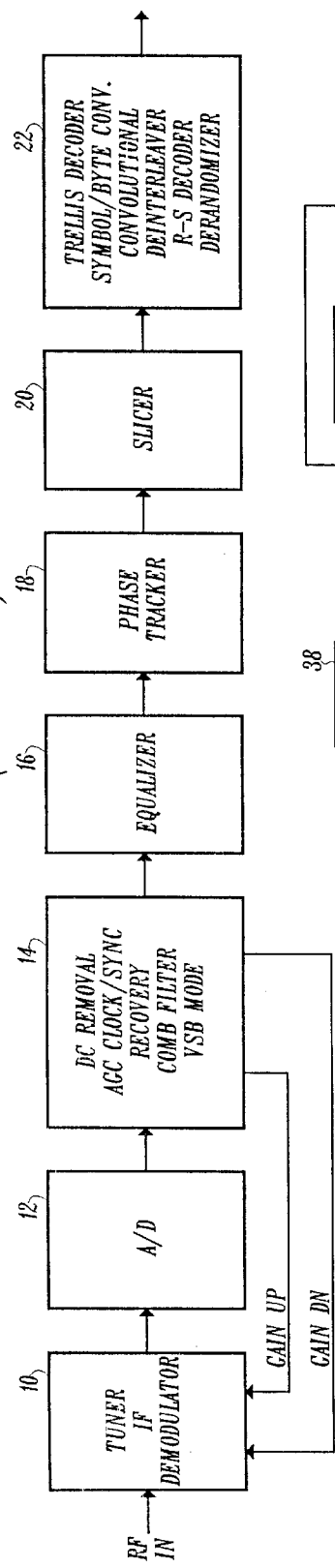
FIG. 1 is a simplified partial block diagram of a prior art VSB receiver.

Referring to FIG. 1, an RF signal (which may be cable or over-the-air) is applied to a tuner IF and demodulator 10 where it is processed in a well known manner to develop a baseband analog signal. The demodulated signal is converted to digital form in an A/D (analog-to-digital) converter 12 and applied to a block 14 that includes appropriate circuitry for removing DC, developing gain up and gain down AGC voltages, recovering clock information and sync signals, operating a comb filter and developing a VSB mode signal. The VSB mode of the received signal is also determined at this point. The signal is applied to an equalizer 16 that in turn supplies a phase tracker 18, which is operated in accordance with the teachings of U.S. Pat. No. 5,406,587, entitled ERROR TRACKING LOOP. The phase tracker supplies a slicer 20 that operates as described in the above-mentioned patent to recover the symbols in the received signal. Slicer 20 feeds a block 22 that includes a symbol/byte converter, convolutional deinterleaver circuitry, a trellis decoder, an R-S decoder and a derandomizer, all of which are well known in the art. The output data is applied to well known television or data processing circuitry (not shown) for display/use of the data.

Figure 2:
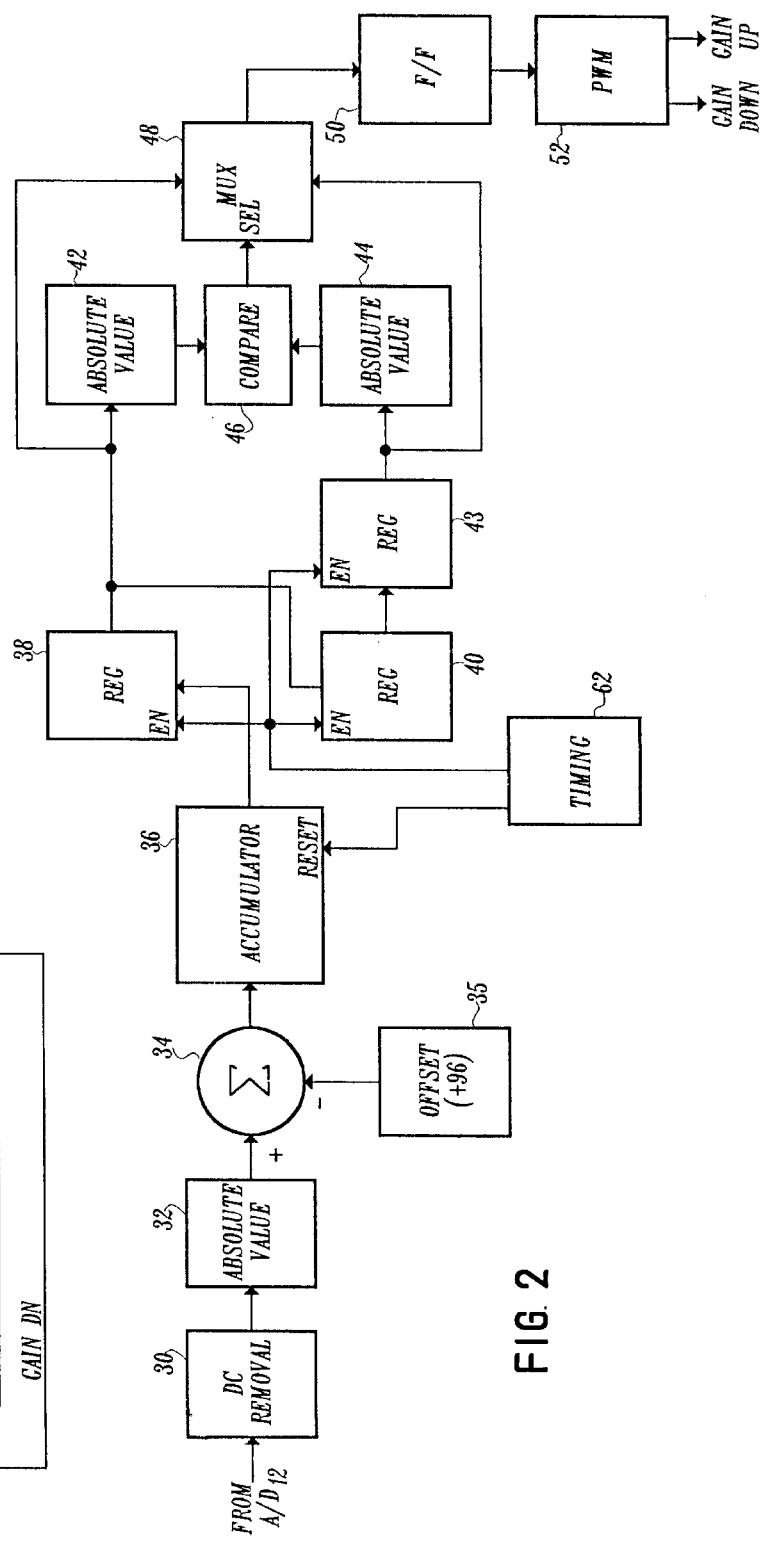
FIG. 2 is a block diagram of an AGC generation system for the circuit of FIG. 1 that embodies the invention.

FIG. 2 represents an AGC generation circuit constructed in accordance with the invention. The signal from A/D 12 is coupled to a DC removal circuit 30 where the DC due to the pilot and other DC offsets in the VSB signal are removed. The absolute value of the signal is taken in a circuit 32 and applied to a positive input of an adder 34. An offset of +96 in block 35 is coupled to the negative input of adder 34. This offset is the average of the absolute value of the data levels for a particular gain factor. A different gain factor will require a different offset value. Adder 34 supplies the signal to an accumulator 36 that, in turn, supplies a first register 38. Register 38 supplies a second register 40, an absolute value taking circuit 42 and a multiplexer 48. Register 40 supplies the signal to a third register 43, which, in turn, supplies another absolute value taking circuit 44 and multiplexer 48. The outputs of absolute value circuits 42 and 44 are coupled to a comparator 46, where the signals are compared to determine the smaller of the two. Comparator 46 controls the SEL input of multiplexer 48. The output of multiplexer 48 is coupled to a flip/flop circuit 50 (that acts as a register) and its output is coupled to a pulse width modulator (PWM) 52 which generates the AGC voltage and activates either its Gain Up or Gain Down output. Timing signals are produced by a timing block 62 and coupled to the Reset input of accumulator 36 and the Enable inputs of registers 38, 40 and 43. The Reset timing signal determines the duration of accumulation of the samples and in the preferred embodiment occurs once a segment. The result of accumulator 36 is stored in register 38 by the Enable timing signal just before accumulator 36 is reset.

In all VSB modes, the average of the magnitude of the data level symbols is 96 for a selected size of the signal. This is also the average of the two-level sync symbols in the 2VSB signal, for example, and development of an AGC voltage by sampling all or portions of such a signal is not affected by whether the sync symbols are sampled along with the data symbols. It will be appreciated that the AGC voltage may be developed by sampling only the sync symbols, only data symbols or a combination of the two. These arrangements are included in the copending application mentioned above. The larger the portion of the signal that is sampled and averaged, the more accurate the AGC will be, but the slower it will be. Averaging shorter samples makes for a fast acting, albeit less accurate AGC.

In operation, the DC from the pilot and any other DC offsets are removed in DC removal circuit 30 and the absolute value of the remainder of the sampled signal is applied to adder 34 where it is combined with an offset of +96 from circuit 35. The +96 offset results in the level of the data signal at the input to accumulator 36 being zero under ideal conditions. In practice, it is not ideal and the resultant is applied serially to registers 38, 40 and 43. The effect of the registers is to make available three successive sampled portions (segments in the preferred embodiment) of the signal, the first and third of which are compared in comparator 46. The compared portions are also supplied to multiplexer 48 which selects one of the portions based upon its select signal input. As indicated, comparator 46 selects the smaller of the two portions for application to flip/flop 50 and PWM 52 generates a corresponding AGC gain up or down control signal.

The invention ignores the VSB mode or type of signal. By comparing successive sampled portions of the signals and selecting the lesser of the two portions, the effects of the higher level field sync symbols in the over-the-air VSB signals is completely overcome. The system has the benefit of being random as to timing and if the samples are selected at least two segments apart, eliminates the possibility of successively sampling one-half of a data segment and one-half of a field sync segment.

What has been described is a novel method and apparatus for developing AGC potentials in a receiver that is capable of receiving different types of VSB signals in which the desired relationship between the data symbol levels and the sync symbol levels may not obtain. It is recognized that those skilled in the art will envision numerous changes in the described embodiments of the invention without departing from its true spirit and scope thereof. The invention is to be limited only as defined in the claims.

What is claimed is:

1. A method of operating an AGC system in a receiver that receives a plurality of digital signals having different average data symbol levels and average sync symbol levels, comprising:

processing a received signal to determine successive average symbol levels;

comparing pairs of the determined average symbol levels; and using the smaller of the compared average symbol levels to develop an AGC voltage.

2. A method of operating an AGC system in a receiver that receives a plurality of digital signals having a DC pilot and DC offsets and having different average data symbol levels and average sync symbol levels, comprising:

removing the DC pilot and DC offsets from the received signal;

processing the received signal to determine a series of successive average symbol levels;

comparing pairs of the determined successive average symbol levels; and using the smaller of the compared pairs of average symbol levels to develop an AGC voltage.

3. The method of claim 2, wherein the processing further comprises:

averaging the symbols of the received signal over three successive portions thereof;

comparing the first and third successively averaged portions; and selecting the smaller of said compared portions to develop the AGC voltage.

4. The method of claim 3, wherein said processing further comprises:

using timing signals to determine the duration of the average symbol level portions.

5. A receiver for developing an AGC voltage for any of a plurality of received digital signals that have different average data symbol levels and average sync symbol levels, comprising:

means for processing said received signals to determine successive average symbol levels;

means for comparing said successively determined average symbol levels; and means for using the smaller of said compared average symbol levels to develop said AGC voltage.

6. A receiver for developing an AGC voltage for any of a plurality of received digital signals that include a DC pilot and DC offsets and that have different average data symbol levels and average sync symbol levels, comprising:

means for removing said DC pilot and said DC offsets from said received signals;

means for processing said received signals to determine a series of successive average symbol levels;

means for comparing pairs of said successive average symbol levels; and means for using the smaller of said compared pairs of average symbol levels to develop said AGC voltage.

7. The receiver of claim 6, wherein said processing means further comprises:

means for averaging said symbols over three successive portions of said received signal;

means for comparing the first and third of said three successively averaged portions of said received signal; and means for selecting the smaller of said compared portions of said received signal to develop said AGC voltage.

8. The receiver of claim 7, further including:

timing means for developing timing signals from said received signal; and means for applying said timing signals to determine the duration of said portions of said received signal.

* * * * *